(12) United States Patent
Aiello et al.

(10) Patent No.: US 8,527,426 B2
(45) Date of Patent: *Sep. 3, 2013

(54) USING SMARTCARDS TO ENABLE PROBABILISTIC TRANSACTIONS ON AN UNTRUSTED DEVICE

(75) Inventors: William A. Aiello, Madison, NJ (US); Aviel Q. Rubin, West Caldwell, NJ (US); Martin J. Strauss, Summit, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 953 days.

This patent is subject to a terminal disclaimer.

(21) Appl. No.: 12/468,659

(22) Filed: May 19, 2009

(65) Prior Publication Data

US 2009/0319431 A1    Dec. 24, 2009

Related U.S. Application Data

(63) Continuation of application No. 11/006,360, filed on Dec. 6, 2004, now Pat. No. 7,536,359, which is a continuation of application No. 10/316,425, filed on Dec. 11, 2002, now Pat. No. 6,850,909, which is a continuation of application No. 09/412,354, filed on Oct. 5, 1999, now Pat. No. 6,496,808.

(60) Provisional application No. 60/113,308, filed on Dec. 22, 1998.

(51) Int. Cl.
*G06Q 20/00* (2012.01)

(52) U.S. Cl.
USPC ............. 705/64; 713/162; 713/171; 380/228; 380/272; 380/239

(58) Field of Classification Search
USPC ........................................... 705/64
See application file for complete search history.

(56) References Cited

U.S. PATENT DOCUMENTS

| 5,548,648 A * | 8/1996 | Yorke-Smith ................. 713/193 |
| 5,721,777 A * | 2/1998 | Blaze ............................ 380/286 |
| 5,970,143 A * | 10/1999 | Schneier et al. .............. 713/181 |
| 7,869,199 B2 * | 1/2011 | Huang et al. ............. 361/679.01 |
| 2005/0102244 A1 * | 5/2005 | Dickinson et al. .............. 705/74 |

FOREIGN PATENT DOCUMENTS

JP    2005134478 A    *    5/2005

OTHER PUBLICATIONS

Hamman, E. M. et al., Securing e-business applications using smart cards, 2001, IBM Systems Journal, p. 635.*

* cited by examiner

*Primary Examiner* — Peter Choi
*Assistant Examiner* — Alexis Casey
(74) *Attorney, Agent, or Firm* — Hartman & Citrin LLC (57) ABSTRACT

The present intention permits a user to conduct remote transactions without a network while using an untrusted computing device, such as a hand held personal digital assistant or a laptop computer. The computing device is augmented with a smartcard reader, and the user obtains a smartcard and connects it to the device. This design can be used by an untrusted user to perform financial transactions, such as placing bets on the outcome of a probabilistic computation. Protocols are presented for adding (purchasing) or removing (selling) value on the smartcard, again without requiring a network connection. Using the instant protocols, neither the user nor the entity issuing the smartcards can benefit from cheating.

18 Claims, 5 Drawing Sheets

| 1 Ace of Spades | 14 Ace of Hearts | 27 Ace of Diamonds | 40 Ace of Clubs |
|---|---|---|---|
| 2 Two of Spades | 15 Two of Hearts | | 41 Two of Clubs |
| 3 Three of Spades | 16 Three of Hearts | | 42 Three of Clubs |
| 4 Four of Spades | 17 Four of Hearts | | 43 Four of Clubs |
| 5 Five of Spades | 18 Five of Hearts | | 44 Five of Clubs |
| 6 Six of Spades | 19 Six of Hearts | | 45 Six of Clubs |
| 7 Seven of Spades | 20 Seven of Hearts | even of Diamonds | 46 Seven of Clubs |
| 8 Eight of Spades | 21 Eight of Hearts | 34 Eight of Diamonds | 47 Eight of Clubs |
| 9 Nine of Spades | 22 Nine of Hearts | 35 Nine of Diamonds | 48 Nine of Clubs |
| 10 Ten of Spades | 23 Ten of Hearts | 36 Ten of Diamonds | 49 Ten of Clubs |
| 11 Jack of Spades | 24 Jack of Hearts | 37 Jack of Diamonds | 50 Jack of Clubs |
| 12 Queen of Spades | 25 Queen of Hearts | 38 Queen of Diamonds | 51 Queen of Clubs |
| 13 King of Spades | 26 King of Hearts | 39 King of Diamonds | 52 King of Clubs |

FIG. 6 ial Patent Application Ser. No. 60/113,308 filed Dec. 22, 1998;

USING SMARTCARDS TO ENABLE PROBABILISTIC TRANSACTIONS ON AN UNTRUSTED DEVICE

CROSS REFERENCE TO RELATED APPLICATIONS

This application is a continuation of U.S. patent application Ser. No. 11/006,360, filed Dec. 6, 2004, now U.S. Pat. No. 7,536,359; which is a continuation of U.S. patent application Ser. No. 10/316,425, filed Dec. 11, 2002, now U.S. Pat. No. 6,850,909; which is a continuation of U.S. patent application Ser. No. 09/412,354 filed Oct. 5, 1999, now U.S. Pat. No. 6,496,808; which claims priority to U.S. Provisional Patent Application Ser. No. 60/113,308 filed Dec. 22, 1998; which are all incorporated by reference herein in their entirety.

FIELD OF THE INVENTION

The present invention relates to electronic transactions and, more particularly, to systems for conducting electronic transactions with a cryptographic module.

BACKGROUND OF THE INVENTION

When users have access to a communication network, then applications for conducting electronic commerce transactions such as banking, shopping, and gambling can be implemented securely in a straightforward manner. This is because the resources that need protection, namely money, can be secured by cryptographic means in the network. There are many protocols for conducting secure transactions on the Internet, such as the Secure Sockets Layer (SSL) which permits electronic commerce by providing an encryption layer between the application/browser layer and the Internet's TCP/IP layer. (See Kipp E. B. Hickman and Taher Eigamal, The SSL Protocol, Internet draft draft-hickman-netscape-ssl-01.txt, 1995). Secure protocols are already implemented on many mobile devices. Hall et al. have presented protocols for remote electronic gambling for online users. (See Chris Hall and Bruce Schneier, "Remote Electronic Gambling," 13th Annual Computer Security Applications Conference, pages 227-30. December 1997).

There are, however, many occasions when a user is in possession of a small computing device, but is not in communication with the network. There is currently a proliferation of lightweight handheld devices, such as the 3Com Palm Pilot, Windows CE devices, and even laptops that weigh under three pounds. Many of these devices are so portable that people can carry them in their pockets and use them at all times—while in a vehicle traveling, while in a public place, standing in line at a grocery store, sitting at a doctor's office, etc. In such scenarios, it is difficult to allow the user to perform financial transactions because interaction with servers is difficult or not possible. Moreover, it is assumed that the user has full access to the device, so secrets (such as cryptographic keys) cannot be safely stored on it. Accordingly, the prior art does not enable a user to securely conduct electronic transactions on an untrusted remote electronic device.

SUMMARY OF THE INVENTION

The present intention permits a user to conduct remote transactions without a network while using an untrusted computing device, such as a hand held personal digital assistant or a laptop computer. The computing device is augmented with a smartcard reader, and the user obtains a smartcard and connects it to the device. This design can be used by an untrusted user to perform financial transactions, such as placing bets on the outcome of a probabilistic computation. Protocols are presented for adding (purchasing) or removing (selling) value on the smartcard, again without requiring a network connection. Using the instant protocols, neither the user nor the entity issuing the smartcards can benefit from cheating.

The protocols described below have numerous advantages over the prior art and satisfy the following security requirements, particularly as applied to gambling applications: (1) only the issuer of the smartcards is able to add or subtract money from the smartcard without participating in any particular transaction; (2) the issuer must refund the amount on the smartcard whenever the user wishes; (3) once a user commits an amount to a transaction or places a bet on a game, she cannot prevent the loss of that amount if she loses; (4) the user can detect a fraudulent transaction such as when she wins a game but is not credited for her bet; (5) the issuer must publicize the algorithms and probabilities that are actually used by the smartcard (e.g. the house must announce the rules for each game and it must be impossible for the smartcard to weigh the probability further in favor of the house); (6) the issuer can set limits on transactions on the smartcard (e.g. placing limits on bets); and (7) the user cannot risk more than the amount on the smartcard in any transaction. Thus, with respect to gambling, the user can play probabilistic games with assurance that if she wins, she will actually win the money in the bet, and the house knows that users will not be able to cheat. In addition, the user is guaranteed that the odds of winning published by the smartcard are accurate.

These and other advantages of the invention will be apparent to those of ordinary skill in the art by reference to the following detailed description and the accompanying drawings.

DETAILED DESCRIPTION

Figure 1:
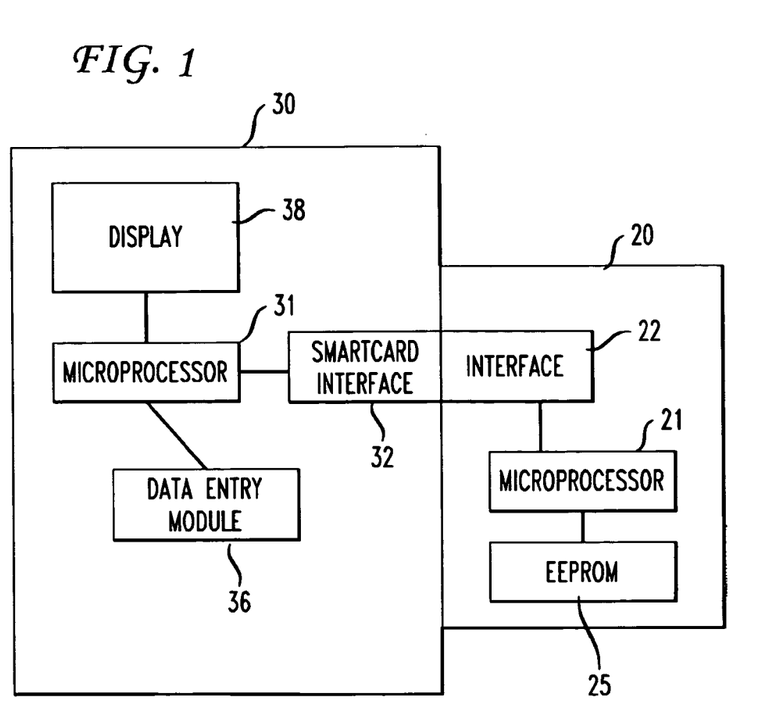
FIG. 1 is an illustrative representation of the major functional components of a portable cryptographic module-and its interaction with a remote computing device.

FIG. 1 illustrates in block diagram format a system designed in accordance with the principles of the present invention. The block diagram of FIG. 1 shows two main components, namely a portable cryptographic module such as a smartcard 20 and a remote computing device 30. The design of the device smartcard combination in FIG. 1 permits a user to conduct a remote transaction—such as gambling—with the entity that issued the smartcard 20 (hereinafter referred to as the "house"). The user is in possession of the remote computing device 30 and purchases smartcards 20 from the house with value stored on them. The house not only issues smartcards 20 with value on them in exchange for money, it is also responsible for redemption of money on smartcards 20. It is assumed that there is, associated with the house, a public/private cryptographic key pair whose public component is well-known.

The smartcard 20 includes a microprocessor 21, an erasable electronic programmable read-only memory (EEPROM) 25, and an interface 22 to a card reader, which, for example, typically comprises an analog interface chip, an inductive coil of a transformer for power, and several capacitive plates, which are not shown in FIG. 1. All smartcard 20 components are preferably laminated beneath the smartcard 20 surface such that no external contacts are accessible to intruders. It is assumed that monetary value can be stored on the card 20 (e.g. several thousand dollars worth) such that reading or modifying the value is more costly to the attacker than the benefit that could be derived from such an attack. The microprocessor 21 typically has a central processing unit and internal memory units (not shown) that store the firmware for an operating system. The internal memory units of microprocessor 21 store protocols for smartcard 20 to receive and transmit data, security and application control software, and memory management programs. Operating under the control of the firmware, microprocessor 21 executes instructions to format data that is transferred to the remote transaction device 30 via the card reader/writer interface. The microprocessor 21 also interprets programmed instructions received from the remote transaction device 30 through the card reader/writer interface, as described in further detail below.

It is advantageous for the smartcard 20 to have a serial number, imprinted visibly on the outside, and that information be placed in smartcard's 20 secure memory at its manufacture time that depends on both the card 20 and the particular entity issuing the smartcard 20. For example, the secure memory can store a signature from the house on the card's 20 serial number which can be utilized in connection with the security protocols discussed more fully below. The smartcard 20 advantageously has a means for generating random numbers. This can be achieved either in hardware (e.g., using a noisy diode or a low-accuracy clock) or in software/firmware (e.g., using a built-in seed and a cryptographic pseudo-random number generator). The latter would require some non-volatile memory, where some state can be maintained over time. Ideally, some combination of these techniques can be used.

The remote computing device 30 is preferably a small portable device that is capable of computation. It can be a special-purpose device built for the instant applications or a standard portable device such as a personal digital assistant or a laptop computer. The only physical requirement is that the device 30 needs to be able to communicate with the cryptographic module. In the present design, the remote computing device 30 is augmented with the smartcard reader/writer interface 32, which analogously to interface 22 comprises an analog interface chip, an inductive coil of a transformer connected to a power supply, and several capacitive plates, again not shown in FIG. 1. In a preferred embodiment, the device 30 also includes a microprocessor 31, a display 38, and some form of data entry module 36. The device 30 should also have a source of random numbers and some means such as EEPROM for storing a public cryptographic key of the house. Since the device 30 is used to interface with the user, it preferably should have a graphical display. There are no security requirements associated with the design of the device 30, which can be "untrusted" to the house. As such, the device 30 is an agent of the user. It is assumed that the user can trust the device 30 to behave properly (in the extreme, the user can build her own device 30 to ensure that). The functionality of the device 30 can be fully specified so that different manufacturers can produce devices 30 that interoperate.

The security protocols described below permit the user to gamble against the house with assurance that, if she wins, she will actually win the money in the bet and with the odds of winning known accurately beforehand. The house is likewise confident that users will not be able to cheat. It should be noted that although the security protocols and requirements are described in relation to the application of gambling, the present invention is not so limited and has application to other forms of transactions conducted remotely with the computing device 30.

Transaction Protocols

Figure 2:
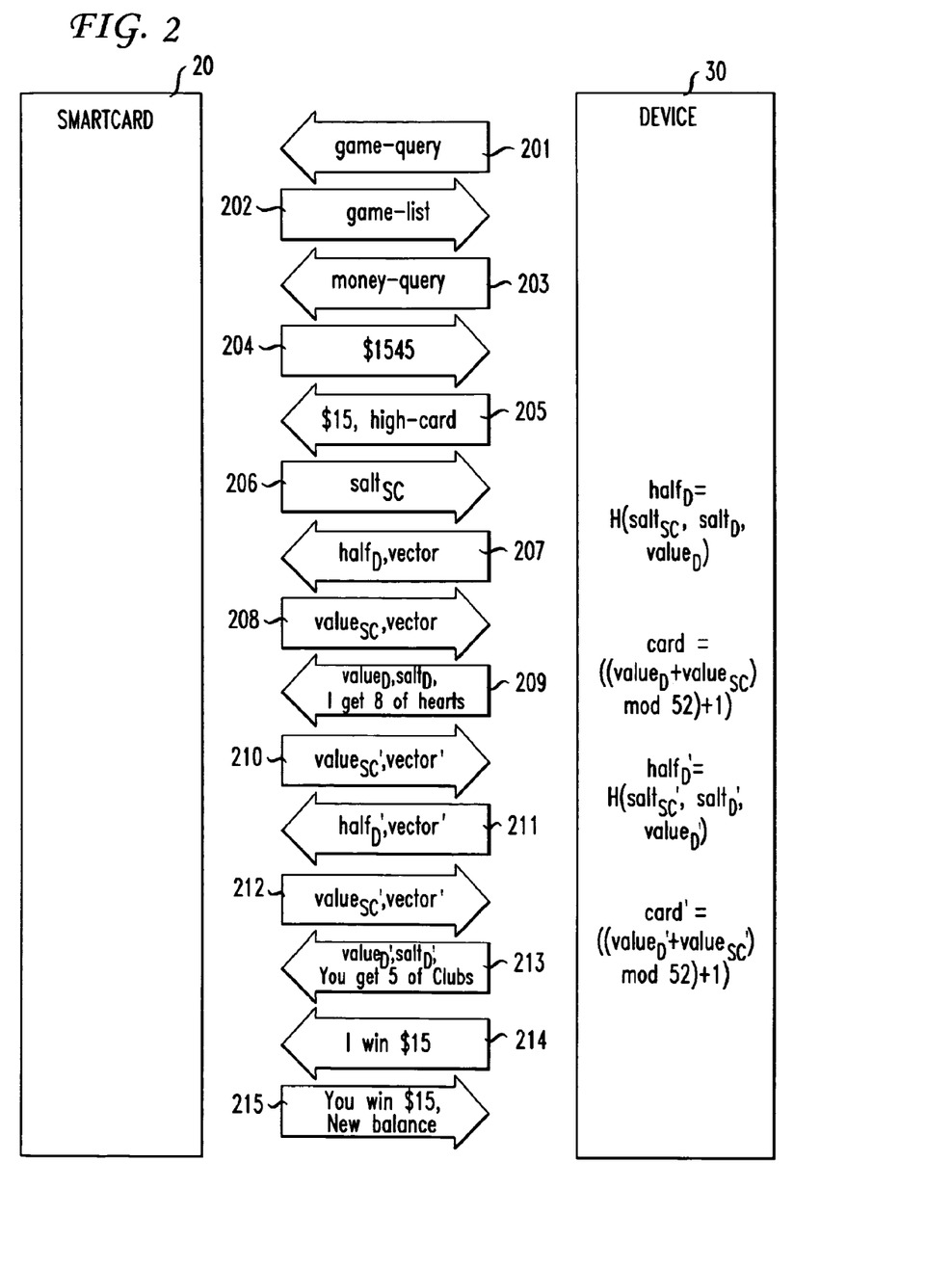
FIGS. 2, 5, and 6 illustrate security protocols that may be used to implement the principles of the present invention.

FIG. 2 illustrates the security protocols as applied to the simple game of "high-card." In the game of high-card, the user and the house are each dealt a card from the same deck and whoever has the highest card wins. The house wins in the case of a tie, and aces are always high. The following notation and abbreviations are used in the discussion:

| NOTATION/ABBREVIATION | DEFINITION |
| --- | --- |
| A → B: Message | A is sending Message to B |
| [text]$_{sc}$ | text is signed by the entity SC. |
| A, B | comma denotes concatenation of A and B |
| SC | smartcard |
| D | device |
| MK | master key |
| SN | serial number |

At step 201, the device 30 sends a message to the smartcard 20 requesting a list of games supported by the smartcard 20. The smartcard 20 responds at step 202, with a list of games. It is assumed that the smartcard 20 can support many different types of games with their own bet limits and odds. Thus, the following messages can be defined where the smartcard 20 informs the device 30 of the games that are available.

Device→Smartcard:game-query

Smartcard→Device:game-list

It is assumed that the rules along with their implied probabilities are either known or included in the list. The list of games could simply be a list of numbers that index into a booklet where games are described in detail. The booklet could be available on the device 30, so that the user could browse the rules before playing. For example, the game of high-card could be identified as follows:

Game: high-card
Odds: 27:24
Limit: $100 per game

The details of how games and odds are represented is not important for the present invention.

The user must have some confidence that the smartcard 20 really has the amount of money that the user has paid the house for it. Therefore, the following query should be defined which the smartcard 20 and the device 30 supports:

Device→Smartcard:money-query

Smartcard→Device:value

This permits the device to prompt the smartcard 20 for the amount of money, and the smartcard 20 returns the current balance. At step 203 and 204, the device 30 uses the defined query to record the balance of money left on the card 20 (this process is useful for the transcript discussed below). At step 205, the user specifies the game she wants to play and the bet she wishes to make, and the device 30 transmits this information to the smartcard 20, e.g.

Device→Smartcard:$15,high-card

Figure 3:
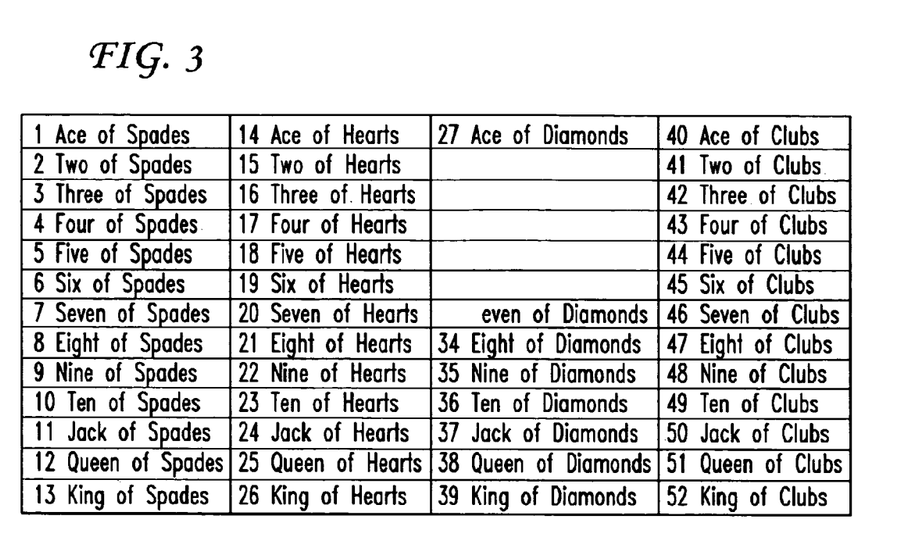
FIG. 3 illustrates a possible mapping between integers and the values of a deck of cards.

At steps 206-209, the smartcard 20 and device 30 execute a protocol for the dealing of a random face-up card. That is, the protocol allows a card to be chosen at random from a deck such that each card is equally likely to be chosen, and there is no way for the device 30 nor the smartcard 20 to bias the selection. In the end, the card is known to both parties. The protocol is described with respect to a standard poker deck of 52 cards, although the protocol is easily generalized for other games as further described below. The cards in the deck are mapped to integers, as set forth in FIG. 3, so that the problem of dealing a card reduces to picking a number from 1 to 52. Thus, it can be said that the Ace of Hearts has been dealt if the number 14 is chosen. In order for a card to be dealt, the device 30 and the smartcard 20 run a protocol whereby they agree on a number from 1 to 52. To accomplish this, basically each side provides a random piece, and they are combined in such a way that a random choice results.

At step 206, the smartcard 20 chooses a random number $salt_{SC}$ from 1 to 2160, and sends it to the device 30:

$$\text{Smartcard} \rightarrow \text{Device}: salt_{SC}$$

The device 30, on the other hand, chooses a random number $salt_D$ from 1 to 2160, and another random number $value_D$ from 1 to 52. The device 30 concatenates the three numbers and computes a one-way transformation:

$$half_D = H(salt_{SC}, salt_D, value_D)$$

It is assumed that for a randomly chosen $salt_D$ unknown to the smartcard 20, $half_D$ appears pseudo-random and thus reveals only negligible information about $value_D$ to the computationally bounded smartcard 20. In practice: a cryptographic hash function such as SHA1, can be utilized. At step 207, the device then sends $half_D$ to the smartcard 20:

$$\text{Device} \rightarrow \text{Smartcard}: half_D, \text{vector}$$

Vector, as further described below, permits the dealing of subsequent cards from the same deck without duplication of the same card. The smartcard 20 then chooses a random number $value_{SC}$ from 1 to 52. At this point both the smartcard 20 and the device 30 have committed to their values, but the smartcard 20 does not know $value_D$ and the device 30 does not know $value_{SC}$.

At step 208, the smartcard 20 reveals $value_{SC}$ to the device 30:

$$\text{Smartcard} \rightarrow \text{Device}: value_{SC}, \text{vector}$$

The device 30 in turn, at step 209, sends $value_D$ and $salt_D$ to the smartcard 20:

$$\text{Device} \rightarrow \text{Smartcard}: value_D, salt_D$$

Both sides can then compute:

$$k = ((value_D + value_{SC}) \bmod 52) + 1$$

which gives a random number from 1 to 52, the card that is dealt. In FIG. 2, the calculation results in the computation of the number _ which deals the card 8 of Hearts to the user at step 209. It is important that the commitment made by the device 30 in step 207 be verified by the smartcard 20. After the smartcard 20 receives the message in step 209, it must check that the value submitted is the same one that was committed to earlier. To do this, the smartcard 20 simply recomputes the hash of the two salts and the value and compares it to the value submitted in the message at step 207. It also verifies that the card chosen is the correct one, the 8 of Hearts in the example.

The device 30 and the smartcard 20 are, in essence, utilizing the transformation H to implement a commitment protocol. The purpose of $salt_D$ is to prevent the smartcard from computing the value chosen by the device 30 by exhaustively searching for the preimage of H. For example, if the device 30 simply sent $H(value_D)$ or $H(value_D, salt_{SC})$, the smartcard 20 could compute H for each number from 1 to 52 and see which one matched. It could then force any card it wanted to as the choice by picking its value appropriately. The purpose of introducing $salt_{SC}$ is to prevent a nonuniform device 30 from opening the commitment H( ) in two ways. For example, if the protocol requires the device 30 to simply send $H(value_D, salt_D)$, then the device 30 could compute, offline, values $salt_D$, $value_D$, $salt_{D'}$, $value_{D'}$ with $H(salt_D, value_D) = H(salt_{D'}, value_{D'})$ but with $value_D = value_{D'} \bmod 52$. This would allow the device 30 to affect the outcome of the dealt card calculation by choosing $value_D$ or $value_{D'}$ after learning $value_{SC}$. By utilizing the above protocol and a hash function for H, either the device 30 or the smartcard 20 can ensure that the resulting value is random and unbiased by the other party.

It should be noted that the hash function H must have a number of scrambling properties of the sort commonly assumed in the literature and commonly attributed to SHA1. In particular, the hash function needs to interact securely with other operations such as signatures and concatenation, as well as the particular rules of the card game implemented. The precise requirements of the hash function are straightforward, though tedious, to enumerate precisely. Moreover, although the above description uses a hash function to implement commitment, there are other implementations of commitment that can be used—such as those with pseudo-random number generators. Also, note that the commitment is over a secure channel between the smartcard 20 and the device 30, neither of which performs simultaneous transactions with other parties. Thus, it is not necessary that the commitment protocol be non-malleable, even if several cards are dealt in parallel. This is advantageous since non-malleable commitment is inefficient.

Steps 210 to 213 in FIG. 2 parallel the above and results in the card 5 of Clubs being dealt, except that the steps deal with 51 cards instead of 52. The protocol uses a 52-bit vector to keep track of which cards have already been dealt to ensure that the same card is not drawn randomly. At steps 211 and 212 (as well as at 207 and 208), the two sides agree about which cards are still in the deck by transmitting the vector to each other. A bit in the vector is set if the corresponding card is still in the deck, and it is a zero otherwise. Initially the vector consists of 52 ones, and is gradually populated with a zero at the appropriate position in the vector as that corresponding card is dealt. The number of 1s in the vector thus represents the number of cards remaining in the deck. The two values $value_D$ and $value_{SC}$ are chosen from 1 to n, where n is the number of one's that are in the vector. Then, once all of the messages have been exchanged, the two sides compute:

$$k = ((value_D + value_{SC}) \bmod n) + 1$$

Figure 4:
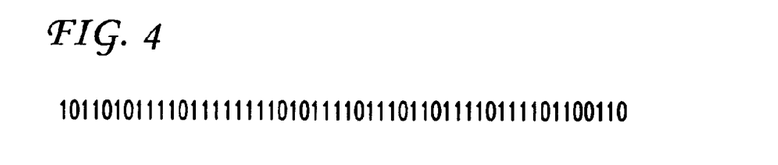
FIG. 4 illustrates an example vector for use with the above protocols.

The result, k, is between 1 and n: inclusive, and the card chosen corresponds to the position of the kth 1 in the vector. Thus, vector' in steps 211 and 212 would be 52-bit vector of 1s with a "0" at the 21st position which corresponds, according to FIG. 3, to the Eight of Hearts. (A more complex example would be a vector with 38 ones, such as the vector set forth in FIG. 4. Assuming that the smartcard 20 and device 30 generate a $value_D$ of 27 and a $value_{SC}$ of 18, then $k = ((27+18) \bmod 38) + 1 = 8$. The 8th 1 is in the eleventh position in the vector, so the card dealt would be the Jack of Spades.)

Accordingly, at steps 210-215 the device 30 and the smartcard 20 exchange the following messages and finally determine that the user has won the game and the bet:

Smartcard→Device:salt$_{SC'}$,

Device→Smartcard:half$_{D'}$,vector'

Smartcard→Device:value$_{SC'}$,vector'

Device→Smartcard:value$_{D'}$,salt$_{D'}$,You get 5 of Clubs

Device→Smartcard:I win $15

Smartcard→Device:You win $15,new balance: $1560

In practice, one could exchange the roles of the smartcard 20 and device 30 for the card dealing protocol in messages 210-215 to increase the number of messages sent in the same direction as previous messages. Successive messages in the same direction can also be collapsed to shorten the protocol. Another simple optimization is to deal all of the cards at once. This could easily be accomplished by combining messages at steps 206 and 210. To deal n cards, the size of each message increases by a factor of n, but the number of messages remains constant at four.

Moreover, the same techniques can be readily extended and used to play other games. For example, the techniques can be used to play the following:

BLACKJACK: The random deal can be readily extended to play other games. First, the house "deals" two face up cards to the user, using the techniques set forth above. Then, the house deals itself a card. The device 30 can display a face down card to the user, but the card has actually not been dealt yet, as a computational matter. The user then decides how to play her hand, and cards are dealt as required. Finally, when the user decides to hold her hand, the dealer's second card is dealt. In the device 30, the down card appears to flip over. Finally, any additional cards needed by the house are dealt. The signed transcript is used to settle any disputes.

SLOTS: The technique used to deal cards can be used to pick random numbers of any size. A slot machine is easy to implement with such a tool. The pictures on each wheel of the slot machine are numbered, and the spinning of each wheel corresponds to the house "dealing" a random number in the proper range. If the slot machine displays give images, then five random numbers are agreed upon by the device 30 and the smartcard 20, and the graphical user interface is used to display five pictures corresponding to the numbers chosen.

CRAPS: Rolling the dice to play craps corresponds to picking two random numbers between one and six. It is straightforward to apply the present invention to do this.

POKER: A typical poker machine can be implemented as follows. The house deals five cards to the user. The user discards up to four of them (four is only allowed if the fifth card is an ace). The house then deals cards to replace the discarded ones. If the quantity of the hand is above a certain threshold, the user wins. This again can be accomplished using the above techniques.

Digital Signatures and Message Chains

Although the above protocols provide protection against user cheating, the user is not protected against smartcard 20 cheating, such as when the smartcard 20 includes a bogus message as the previous message received from the device 30. The system design is notably asymmetric: the smartcard's 20 protection against the user is temper-resistant hardware, whereas the user lacks equivalent protection against smartcard 20 misbehavior. In a preferred embodiment of the present invention, protection is provided to the user through the ability of the device 30 to provide a transcript of the communication which can be brought to an arbiter, such as a court of law or an entity mutually agreed upon by the users and the house, for dispute-resolution. The goal is for the device 30 to store an undeniable transcript of all communication with the smartcard 20; that is, the house should not be able to repudiate that the messages in the transcript were sent. Non-repudiation can be achieved through the use in the protocol of signing and hash chaining.

In a preferred embodiment of the present invention, signature verification is implicitly part of the above protocol. The smartcard 20 signs every message in the above protocol before it is sent. It is assumed that the first message from the smartcard 20 includes the public key certificate for the smartcard 20 signed by the house. So, in effect, every message sent by the smartcard 20 above should be read as [msg]$_{SC}$, [SC, public-key(SC)]$_H$ where H represents that the smartcard's 20 certificate and public key has been signed by the house public key. Thus, anyone in possession of the public key of the house can verify the certificate and then the signature by the smartcard 20. Notably, although the smartcard 20 signs messages, the device 30 as an untrusted agent of the user does not have to sign messages.

Finally, non-repudiation can be achieved through the use of hash chaining, a known method for linking messages to each other within a communication session. The device 30 generates a random key, KD upon startup, and uses this key to produce a message of authentication code (MAC) of messages that are sent to the smartcard 20. Cryptographic has functions such as SHA1 or MD5 that can be utilized to generate the MAC. Subsequent MAC computations include all previous MACs, and this is referred to as a running MAC. When the smartcard 20 includes the previous message in its signed message, the running MAC is included as well. The running MAC is included in every message sent from the device 30 to the smartcard 20 and is computed over the previous message received from the smartcard 20, the current message being sent, and the running MAC from the previous message sent. In other words, the running MAC can be defined as follows.

$R\text{MAC}_1 = \text{MAC}_{KD}(\text{msg}_1)$ $R\text{MAC}_n = \text{MAC}_{KD}(\text{msg}_{n-1}), \text{msg}_n, R\text{MAC}_{n-2})$ To illustrate, the communication between the device 30 and smartcard 20 would be as follows:

Device→Smartcard:$x_1$=msg$_1$,MAC$_{KD}$(msg$_1$)

Smartcard→Device:$x_2$=[msg$_2$,$x_1$]$_{SC}$

Device→Smartcard:$x_3$=msg$_3$,MAC$_{KD}$(msg$_2$,msg$_3$, MAC$_{KD}$(msg$_1$))

Smartcard→Device:$x_4$=[msg$_4$,$x_3$]$_{SC}$

The third message can be written simply as:

Smartcard→Device:$x_3$=msg$_3$,$R$MAC$_3$

Since every message from the device 30 contains a running MAC, it is impossible for the smartcard 20 to produce a valid message that contains a forged message from the device 30. Non-repudiation is achieved if it is assumed that there is no way for the device 30 to generate two messages that map to the same MAC output with different keys. While this is not a proven property of MAC functions such as HMAC, it is widely believed to hold (the smartcard 20 can improve things by including a new random value in every message). Armed with the history of the messages recorded by the device 30, a user can prove that the device 30 sent and received messages in the order that they occurred.

Protocols for Adding or Removing Value

Figure 5:
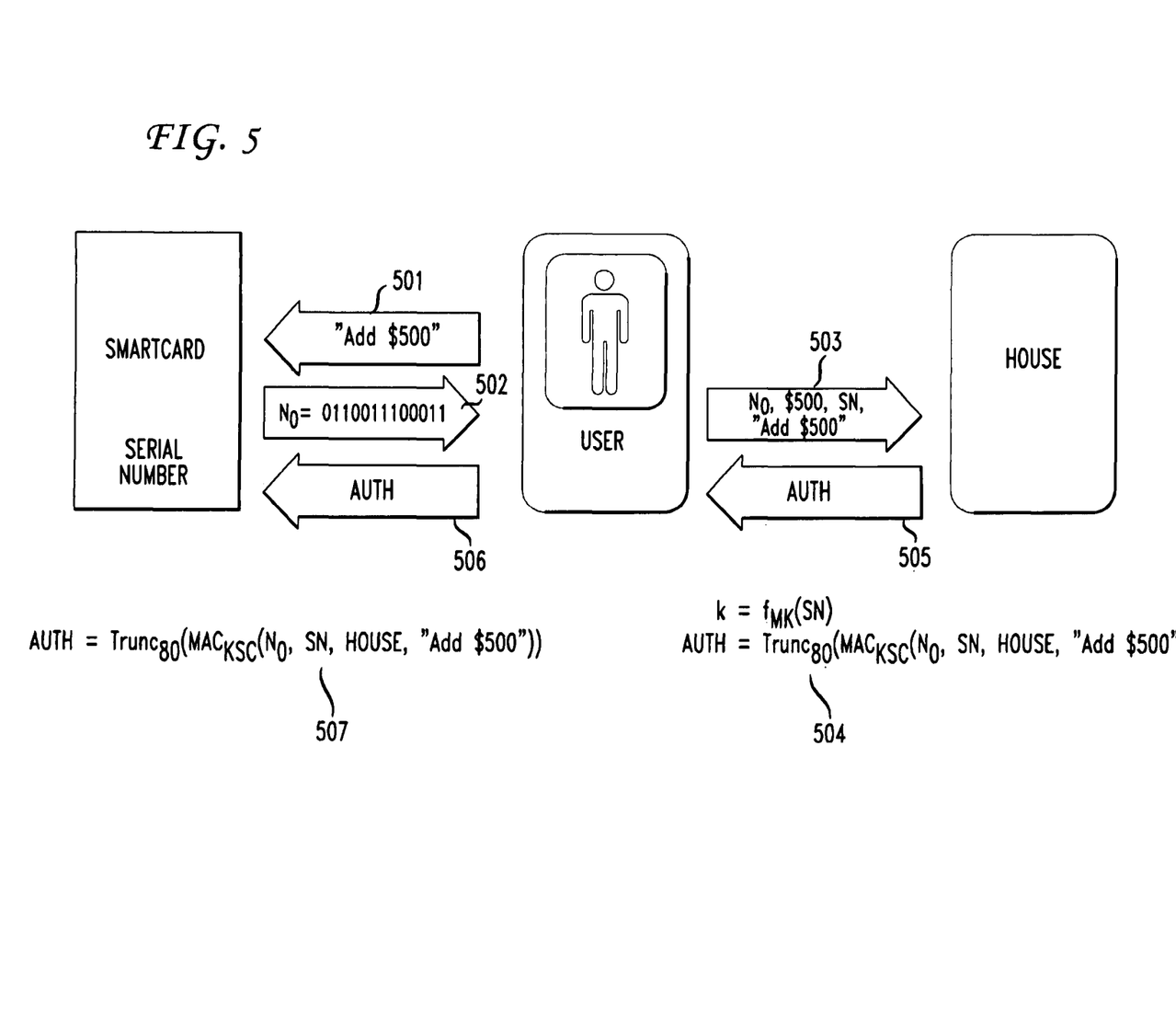

Security protocols can be provided for allowing a user to have the balance on her card 20 increased by paying more money to the house—and for allowing the user remove value or "cash out" the balance on the card 20. These protocols have clear application beyond the domain of probabilistic transactions. Where there is a high bandwidth channel available between the smartcard 20 and the house, e.g. where the device 30 is equipped with a modem that can dial into the house, value can be added to the smartcard 20 as follows: the user can pay $100, for example, to the house by using a credit card over the telephone or while connected to the internet. Then, the user would dial the house from the device 30, and the house would send a signed message to the card to increase the balance by $100. A challenge/response protocol could be used to avoid replay. The smartcard 20 would then verify the signature of the house and increase the balance accordingly. As for cashing out the value of the smartcard 20, the user can indicate to the house that she wishes to cash out, connect the device 30 up to the house, and the smartcard 20 can send a signed message to the house over the modem connection indicating that the user cashes out a particular balance. The smartcard 20 then sets the balance to zero, and the house issues a check for the amount to the user. Measures can easily be taken to protect against replay.

Where there is no direct communication between the device 30 and the house, the protocol illustrated in FIG. 5 can be utilized to add value to the smartcard 20. It is assumed that some low bandwidth connection exists between the user and the house and between the user and the smartcard 20. For example, the user could make a telephone call to the house, enter a credit card number and expiration date, and receive a short string of alphanumeric characters back. The same could readily be accomplished over the Internet. The actual transport does not matter, except for the limiting factor that there is no way for the house or the device 30 to communicate thousands of bits to each other in a user-friendly fashion. Once the user has paid for the credit, a way is needed for the house to add the credit to the smartcard 20 in such a way that the amount is added exactly once, even in the face of a malicious user who is trying to maximize the value of her smartcard. In accordance with an embodiment of the present invention, the smartcard 20 authenticates the request from the house by verifying that only the house could have possibly generated some string. One method of achieving this is by establishing a shared secret between the house and the smartcard 20. A difficulty is that every smartcard 20 must have a different secret. Otherwise, compromising one smartcard 20 could lead to impersonation of all the other smartcards 20. On the other hand, it is disadvantageous to store a large number of secret keys at the house.

The solution employed in a preferred embodiment of the present invention is the use of pseudo-random functions. The house generates a master cryptographic key, MK, which it uses to compute the secret keys on the smartcards 20. Every smartcard 20, SC, comes with a unique serial number, SN, that is visible on the outside of the card 20. When a smartcard 20 is manufactured, the house computes a secret key $$K_{SC} = f_{MK}(SN)$$

which is a pseudo-random function keyed by the master key and evaluated at the serial number. It has been shown that desirable pseudo-random properties for f above can be easily constructed from simple hash functions such as HMAC. The secret key, $K_{SC}$, is stored in the tamper-resistant portion of the smartcard 20. The key need not be saved by the house, since it can be recomputed from the serial number and the master key. Once the shared secret, namely the secret key, is established, messages can be authenticated using a secure MAC, such as HMAC. Thus, messages can be reliably transferred between the house and the smartcard 20 with the user as an intermediary such that only the entities in possession of the secret cryptographic key, namely the house and the smartcard 20, could have produced the MAC.

As illustrated in FIG. 5, for example, the user at step 501 utilizes the data input means on the device 30 to indicate that she wishes to add $500 to the smartcard 20. The smartcard 20, at step 502, issues a challenge consisting of an 80 bit random nonce, $N_0$. The nonce can be of any length, although it is preferably at least 80 bits in length which can be represented by 16 alphanumeric characters, which is a reasonable amount for a user to read and convey to the house. Once the smartcard 20 issues the challenge, it locks up and refuses any message except a valid AUTH response corresponding to the amount in the initial message (it is preferable that the card lock up until it receives a correct AUTH from the user to prevent parallel runs of the protocol, which could lead to potential attacks). At step 503, the user pays the house $500. This can be accomplished by credit card, check, cash, or any other form. In addition, she passes along the nonce and the serial number, which she can read off the outside of the smartcard 20. The entire transaction could take place by telephone if the house is willing to accept credit card payments by phone. Once the house receives the challenge, at step 504, it computes the secret key, $K_{SC}$, from the serial number and the master key. It then computes the MAC of the nonce and the request to add $500. The result can then be truncated to contain only the first 80 bits. At step 505, these are then sent to the user as an authorization code AUTH of 16 alphanumeric characters. The user, at step 506, then enters AUTH into the device 30, which passes it along to the smartcard 20. The smartcard 20, at step 507, uses its stored secret key, $K_{SC}$, to compute the truncated MAC on the request to add $500 and compares it to the one received from the house. If the computed value does not match the value from the house, then the card 20 remains locked. Otherwise, the balance on the card 20 is increased by $500. The protocol in FIG. 5 can also be represented by the following notation:

User→Smartcard:"Add $500"

Smartcard→User:$N_0$

User→House:$N_0$,SN,$500,"Add $500"

House→User:AUTH=Trunc$_{80}$(MAC$_{KSC}$($N_0$,SN, House,

User→Smartcard:AUTH

The messages can be further signed and chained, as described above. Again, the length of the nonce and AUTH can be longer or shorter: shorter lengths may be more susceptible to compromise while longer lengths may be too long for a user to relay comfortably to the house. The above protocol is advantageously not susceptible to replay. To successfully add any amount to the smartcard 20, the user must receive a new challenge from the smartcard 20, and the smartcard 20 does nothing until the AUTH for that amount is received. The house only releases AUTH values for the amounts that are paid, so replaying any of the messages in the protocol cannot result in stealing money from the house. An adversary who does not possess the master key cannot produce a valid AUTH for an arbitrary smartcard 20. Furthermore, if someone breaks into a smartcard 20, she can only expose the secret key for that particular card 20, because keys are independent from each other, given the properties of pseudo-random functions. The scheme introduces no further loss than the compromised card 20: compromising one card 20 does not give one the ability to add value to another card 20.

Figure 6:
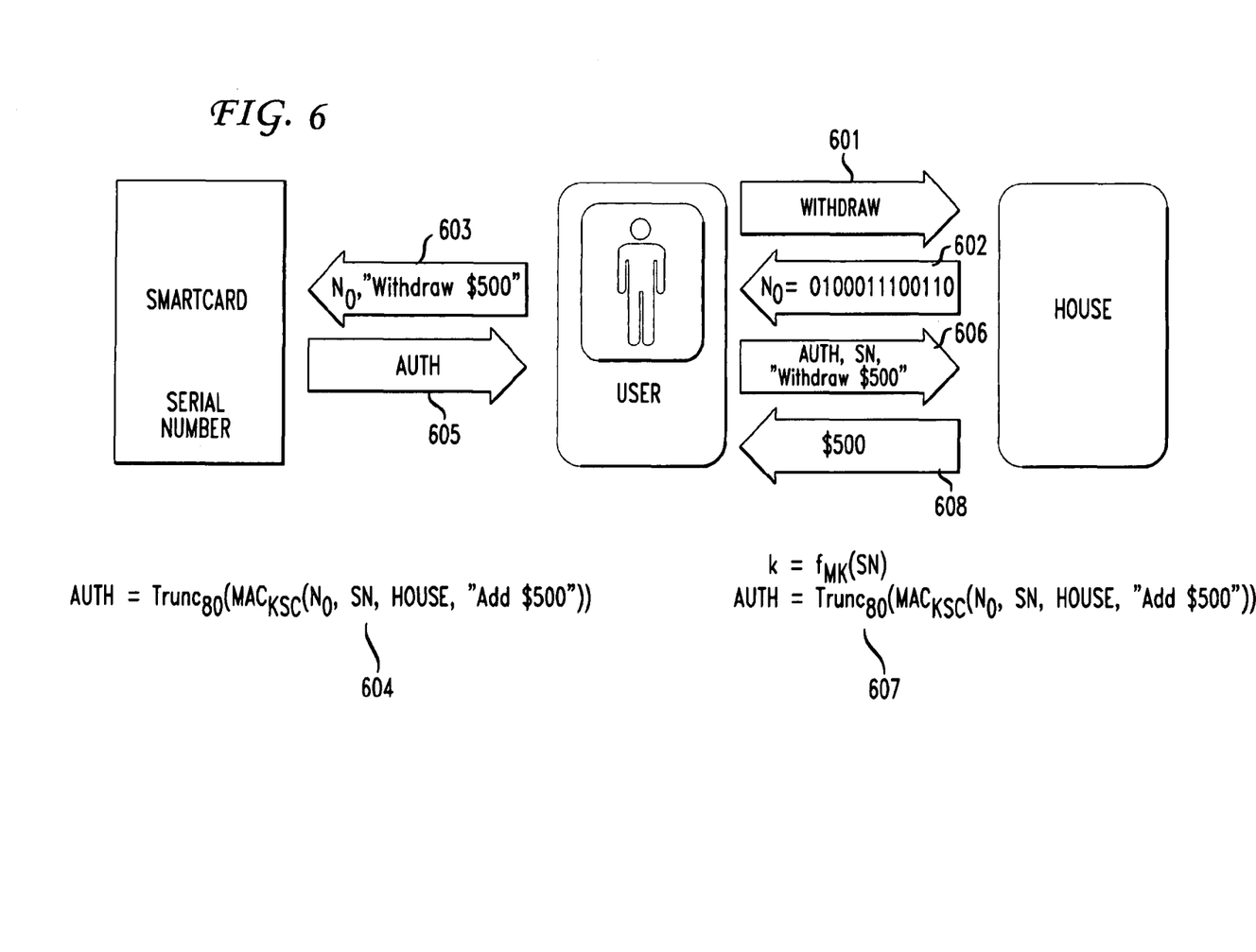

Analogously to FIG. 5, FIG. 6 illustrates a protocol which can be used to cash out the value of the smartcard 20 where there is no direct communication between the device 30/smartcard 20 and the house. It is again assumed that the bandwidth between the house and the smartcard 20 is limited by a user in the middle of the protocol. Again, the entire transaction can be conducted over a telephone call from the user to the house or over the Internet, etc. At step 601, the user contacts the house and indicates a desire to withdraw money from the smartcard 20. The house, at step 602, provides a challenge which consists of a random nonce, preferably at least 80 bits in length which can be encoded in 16 alphanumeric characters. The user, at step 603, enters the 16 characters into the device 30 along with the amount to be withdrawn, e.g. $500, which are then fed into the smartcard 20. The smartcard 20 checks its value; if it does not have $500, it returns an error. Otherwise, the smartcard 20 deducts $500 from the card 20 and constructs a MAC of the challenge and the amount to be withdrawn and truncates this message to 80 bits in order to produce AUTH at step 604. The smartcard 20 transmits the AUTH to the user via the device 30 at step 605, which the user can read to the house at step 606, along with the serial number on the back of the smartcard 20. The user also indicates that the authorized withdrawal is for $500. The house, at step 607, then constructs the smartcard's 20 secret key, $K_{SC}$, from the serial number and computes the MAC and compares the resulting string to the authorization from the user. If they match, the house then at step 608 mails a check to the user for $500 (or performs a wire transfer or any other form of payment). The cash out protocol example in FIG. 6 can also be represented with the following notation:

User→House:Withdraw

House→User:$N_0$

User→Smartcard:$N_0$,"Withdraw $500"

Smartcard→User:AUTH=$Trunc_{80}(MAC_{KSC}(N_0,SN,$
House,"Withdraw $500"))

User→House:AUTH,SN,"Withdraw $500"

House→User:$500

Again, these protocols work because both the smartcard 20 and the house have access to $K_{SC}$, while nobody else does. In order to ensure that the house is able to refund the amount on the smartcard 20 whenever the user wishes, the house can keep a certain amount of money in escrow, perhaps under the control of an arbiter.

Audit Process

Regardless of the cryptography or protocols utilized in a secure system, it is advantageous to include logging, audit, and other controls in a complete system. For example, it is advantageous for the house to monitor cash out requests very carefully, for example by logging all cash out requests by serial number. In the unlikely event that a particular smartcard 20 is physically compromised, there is a danger that an attacker could attempt to manufacture money. An alarm should be triggered if a particular smartcard 20 requests cash out with frequency or amount above a certain threshold. The suspected serial number should be added to a watch list, and if the behavior continues, an investigation may be required. One countermeasure is to notify the user that the next time she tries to cash out that her card is being replaced. The replaced card 20 should in turn be automatically placed on a hotlist that is closely monitored. Another possible countermeasure is to issue cards 20 with expiration times, which would limit exposure to a valid period. This could, however, lead to the side effect of increasing the take of the house because of money lost to expired smartcards 20, which may be ill-perceived by users.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description described security protocols as applied to a personalized gambling device used to play high-card. However, the principles of the present invention could be extended to perform other games as well as other types of remote transactions. Such extensions could be readily implemented by one of ordinary skill in the art given the above disclosure.

What is claimed is:

1. A smart card, comprising:
an interface to a user's device;
a processor in communication with the interface; and
a memory coupled to the processor, the memory storing program instructions that are executed by the processor to perform operations comprising:
issuing a first random string to the user's device, the first random string being based in part on a first cryptographic key stored in the memory;
locking a cryptographic module stored on the memory;
receiving an authorization code and a value to be added from the user's device, the authorization code including a message authentication code being based in part on a second cryptographic key;
authenticating the message authentication code using the first cryptographic key and a serial number stored on the memory;
adding the value to the cryptographic module; and
unlocking the cryptographic module.

2. The smartcard of claim 1, wherein the operations further comprise:
generating a first random number;
receiving a second random number from the user's device, the second random number generated from a commitment number by the user's device;
transmitting the first random number to the user's device after receiving the second random number;
receiving the commitment number from the user's device after transmitting the first random number;
calculating a third random number to enable a probabilistic transaction with the user's device, the third random number calculated from the first random number and the commitment number; and
validating the third random number based on the second random number.

3. The smartcard of claim 2, wherein the operations further comprise:
generating a first salt random number; and
transmitting the first salt random number to the user's device prior to said transmitting the first random number,
wherein receiving the commitment number further comprises receiving a second salt random number from the user's device, the second random number generated from the first salt random number, the second salt random number and the commitment number.

4. The smartcard of claim 1, wherein the serial number is printed on an external surface of the smartcard.

5. The smartcard of claim 1, wherein the user's device is a portable computer.

6. The smartcard of claim 1, wherein the first cryptographic key is based in part upon the second cryptographic key using a pseudorandom function.

7. A non-transitory tangible computer-readable storage medium storing program instructions that are executed by a processor to perform operations comprising:
issuing, via an interface between a smart card and a user's device, a first random string to the user's device, the first random string being based in part on a first cryptographic key;
locking a cryptographic module on the smart card;
receiving an authorization code and a value to be added from the user's device, the authorization code including a message authentication code being based in part on a second cryptographic key;
authenticating the message authentication code using the first cryptographic key and a serial number associated with the smart card;
adding the value to the cryptographic module; and
unlocking the cryptographic module.

8. The storage medium of claim 7, wherein the operations further comprise:
generating a first random number;
receiving a second random number from the user's device, the second random number generated from a commitment number by the user's device;
transmitting the first random number to the user's device after receiving the second random number;
receiving the commitment number from the user's device after transmitting the first random number;
calculating a third random number to enable a probabilistic transaction with the user's device, the third random number calculated from the first random number and the commitment number; and
validating the third random number based on the second random number.

9. The storage medium of claim 8, wherein the operations further comprise:
generating a first salt random number; and
transmitting the first salt random number to the user's device prior to said transmitting the first random number,
wherein receiving the commitment number further comprises receiving a second salt random number from the user's device, the second random number generated from the first salt random number, the second salt random number and the commitment number.

10. The storage medium of claim 7, wherein the serial number is printed on an external surface of the smart card.

11. The storage medium of claim 7, wherein the user's device is a portable computer.

12. The storage medium of claim 7, wherein the first cryptographic key is based in part upon the second cryptographic key using a pseudorandom function.

13. A method, comprising:
issuing, from a smart card comprising a processor, a first random string to a user's device via an interface coupled to the processor, the first random string being based in part on a first cryptographic key stored in a memory of the smart card;
using the processor for locking a cryptographic module on the smart card;
receiving, by the processor via the interface, an authorization code and a value to be added from the user's device, the authorization code including a message authentication code being based in part on a second cryptographic key;
authenticating, by the processor, the message authentication code using the first cryptographic key and a serial number stored on the memory; and
adding, by the processor, the value to the cryptographic module.

14. The method of claim 13, further comprising:
generating a first random number;
receiving a second random number from the user's device, the second random number generated from a commitment number by the user's device;
transmitting the first random number to the user's device after receiving the second random number;
receiving the commitment number from the user's device after transmitting the first random number;
calculating a third random number to enable a probabilistic transaction with the user's device, the third random number calculated from the first random number and the commitment number; and
validating the third random number based on the second random number.

15. The method of claim 14, further comprising:
generating a first salt random number; and
transmitting the first salt random number to the user's device prior to said transmitting the first random number,
wherein receiving the commitment number further comprises receiving a second salt random number from the user's device, the second random number generated from the first salt random number, the second salt random number and the commitment number.

16. The method of claim 13, wherein the serial number is printed on an external surface of the smart card.

17. The method of claim 13, wherein the user's device is a portable computer.

18. The method of claim 13, wherein the first cryptographic key is based in part upon the second cryptographic key using a pseudorandom function.

* * * * *